United States Patent
Omizo et al.

(10) Patent No.: US 7,349,762 B2
(45) Date of Patent: Mar. 25, 2008

(54) SYSTEMS AND METHODS FOR THERMAL MANAGEMENT

(75) Inventors: Takashi Omizo, Kanagawa (JP); Charles R. Johns, Austin, TX (US); Michael F. Wang, Austin, TX (US); Kazuaki Yazawa, Chiba (JP); Toshiyuki Hiroi, Saitama (JP)

(73) Assignees: Kabushiki Kaisha Toshiba, Tokyo (JP); International Business Machines Corporation, Armonk, NY (US); Sony Computer Entertainment Inc., Tokyo (JP)

( * ) Notice: Subject to any disclaimer, the term of this patent is extended or adjusted under 35 U.S.C. 154(b) by 17 days.

(21) Appl. No.: 11/271,460

(22) Filed: Nov. 10, 2005

(65) Prior Publication Data

US 2007/0106428 A1 May 10, 2007

(51) Int. Cl.
*G06F 17/40* (2006.01)
(52) U.S. Cl. .......................... 700/278; 438/17; 438/54; 713/322; 713/501
(58) Field of Classification Search ................ 700/278; 257/48, 499; 438/10.17, 54; 713/322, 501
See application file for complete search history.

(56) References Cited

U.S. PATENT DOCUMENTS 5,502,838 A * 3/1996 Kikinis ........................ 713/501
6,590,405 B2 * 7/2003 Okayasu ....................... 324/760
2005/0162962 A1 * 7/2005 Shirota et al. ............... 365/222
2006/0012930 A1 * 1/2006 Oh et al. ..................... 361/91.6
2006/0023546 A1 * 2/2006 Park ........................... 365/222

* cited by examiner

Primary Examiner—Leo Picard
Assistant Examiner—Sheela Rao
(74) Attorney, Agent, or Firm—Law Offices of Mark L. Berrier

(57) ABSTRACT

Systems and methods for sensing temperatures of multiple functional blocks within a digital device and controlling the operation of these functional blocks in a manner that selectively reduces temperatures associated with some of the functional blocks, but not others. One embodiment comprises an integrated circuit having multiple functional blocks (such as processor cores) and a set of thermal sensors coupled to sense the temperatures of the functional blocks. The integrated circuit includes control circuitry configured to receive signals from the thermal sensors, detect thermal events in the functional blocks and to individually adjust operation of the functional blocks to reduce the temperatures causing the thermal events. In one embodiment, the control circuitry includes a detection/control circuit coupled to each of the functional blocks and a thermal management unit configured to evaluate detected thermal events and to determine actions to be taken in response to the thermal events.

14 Claims, 5 Drawing Sheets

SYSTEMS AND METHODS FOR THERMAL MANAGEMENT

BACKGROUND

1. Field of the Invention

The present invention relates generally to electronic devices, and more particularly to systems and methods for sensing the temperature of components within digital devices and adjusting the operation of the components to reduce peak temperatures in the device.

2. Related Art

Integrated circuits such as microprocessors are becoming increasingly complex. The circuit components (e.g., transistors, diodes, resistors and the like) that form these devices are, at the same time, becoming increasingly small, so that more and more functions may be performed by a particular integrated circuit. As the number of circuit components and functions grows, the amount of power that is typically consumed by these integrated circuits typically also increases. With the increased power consumption of the circuits, the amount of heat generated within the circuits increases as well. This heat may affect the performance of the devices, and may even cause the devices to fail.

As a result of the dangers presented by the generation of increased amounts of heat in electronic devices, it is often necessary to be able to detect temperatures within these devices. Thermal sensing circuits are therefore incorporated into some devices in order to detect dangerously high temperatures or even measure temperatures within the devices. For example, a thermal sensing circuit can be incorporated into an integrated circuit in order to sense the temperature of the circuit and determine whether the temperature exceeds a predetermined threshold. If the temperature exceeds this threshold, corrective action (e.g., reducing the activity within the circuit or even shutting down the circuit) can be taken in order to reduce the temperature to a safer level.

Conventionally, thermal sensors include an on-chip component, such as a thermally sensitive diode, and an off-chip component that includes circuitry configured to receive a measurement of some characteristic associated with the on-chip component, and to generate a temperature metric based on this measurement. In the case of an on-chip diode, the voltage drop across the diode is determined, and the temperature is computed based upon this voltage drop.

In conventional systems, one or more thermal sensors are used to sense one or more temperatures within the integrated circuit. These temperatures are then typically processed to generate a single temperature metric (e.g., a maximum or an average of the temperatures.) This temperature metric is then used as the basis for decisions to shut down or slow down the integrated circuit to avoid over-temperature conditions. These systems may not work well, however, in many modern integrated circuits that have multiple functional blocks (e.g., multiprocessor devices.) These devices may have different levels of activity in the different functional blocks which cause the temperatures of the functional blocks to vary. Even within each functional block, there may be hot spots at which activity levels and corresponding temperatures may be higher than in surrounding areas. In these devices, thermal management must be based on a worst-case scenario. In other words, if the temperature in any area of the integrated circuit becomes too high, the operation of the device must be scaled back or stopped. Thus, high temperatures at hot spots can cause the entire device to be shut down or operated at a reduced capacity, even the most of the functional blocks are operating well within acceptable temperature limits. These devices may therefore have less than optimal performance.

It would therefore be desirable to provide systems and methods for providing thermal protection in digital devices, where temperatures sensed in selected areas can be reduced by adjusting the manner in which the device is operated.

SUMMARY OF THE INVENTION

One or more of the problems outlined above may be solved by the various embodiments of the invention. Broadly speaking, the invention includes systems and methods for sensing temperatures corresponding to multiple functional blocks within a digital device and controlling the operation of one or more of these functional blocks in a manner that selectively reduces temperatures associated with some of the functional blocks, but not others.

One embodiment comprises an integrated circuit having a plurality of functional blocks such as processor cores. A set of thermal sensors is coupled to the functional blocks to sense the temperatures of the functional blocks. The integrated circuit includes control circuitry coupled to each of the thermal sensors. The control circuitry is configured to detect thermal events in the functional blocks and to individually adjust operation of one or more of the functional blocks to reduce temperatures in one or more of the functional blocks. In one embodiment, the control circuitry includes a detection/control circuit coupled to each of the functional blocks and configured to receive signals from the thermal sensors on the corresponding functional blocks. A thermal management unit is coupled to the detection/control circuits to evaluate any thermal events that are detected and to determine one or more actions to be taken in response to the thermal events.

In one embodiment, the integrated circuit is a multiprocessor unit that includes multiple processor cores. Multiple thermal sensors may be coupled to each processor core. When the temperature signals generated by the thermal sensors indicate a thermal event, the detection/control circuitry for the processor core that generated the thermal event (the "over-temperature" processor core) asserts a signal to initiate action by the thermal management unit. The thermal management unit then determines the action(s) to be taken to reduce the temperatures that were the basis of the thermal event.

These actions may be communicated to one or more of the detection/control circuits to adjust the operation of the corresponding processor cores. The thermal management unit may alternatively adjust the operation of the processor cores itself (e.g., by redirecting instructions or instruction streams among the processor cores.)

An alternative embodiment comprises a method including monitoring the temperatures of multiple functional blocks (e.g., processor cores in a multiprocessor,) detecting thermal events in the functional blocks, and individually adjusting operation of one or more of the functional blocks to reduce the temperatures that gave rise to the thermal events. In one embodiment, the thermal management unit determines whether a lighter context is being executed in one of the other processor cores and, if so, switches the contexts of this processor core and the over-temperature processor core. Alternatively, the thermal management unit may switch contexts between the over-temperature processor core and one of the other processor cores that has lower temperatures. Alternatively, the thermal management unit may simply adjust operation of the over-temperature processor core to reduce its temperature (e.g., by reducing the clock speed of this processor core, reducing its power supply voltage, suspending its operation, or the like.)

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
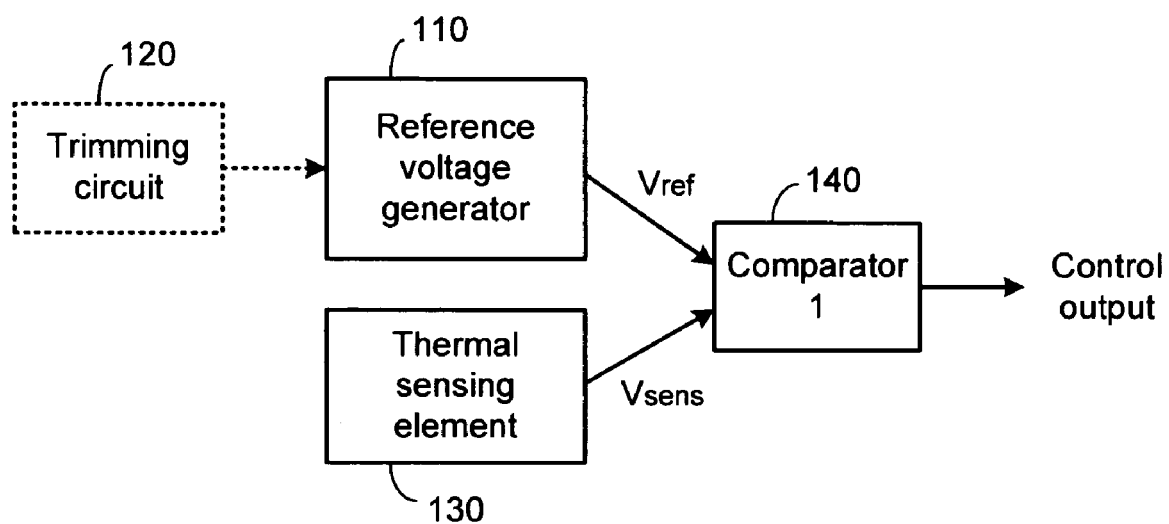
FIG. 1 is a block diagram illustrating the structure of one type of thermal sensing circuit.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for sensing temperatures corresponding to multiple functional blocks within a digital device and controlling the operation of one or more of these functional blocks in a manner that selectively reduces temperatures associated with some of the functional blocks, but not others.

In one embodiment, a thermal management system is implemented in a multiprocessor integrated circuit. The multiprocessor has a number of functional blocks, including multiple processor cores, as well as several functional blocks that provide support functions (e.g., internal bus, I/O, cache memory, etc.) In this embodiment, each processor core has one or more corresponding thermal sensors that are configured to measure the temperatures at various locations on the processor core. For example, the thermal sensors may be positioned to measure temperatures at hot spots on the processor core.

Each of the processor cores has a corresponding block of detection/control circuitry that is configured to receive signals from the thermal sensors that are coupled to the processor core. The detection/control circuitry determines, based upon the signals received from the thermal sensors, whether or not the processor core is experiencing a "thermal event." As used herein, a thermal event is simply an occurrence of conditions which indicate that the processor core is experiencing (or is expecting to experience) temperature conditions which may damage the processor core and/or other functional blocks in the multiprocessor. If the detection/control circuitry detects a thermal event, an indication of the thermal event is communicated to a thermal management unit (which in this embodiment is a routine executing in the operating system.) The detection/control circuitry may, for example, assert an interrupt that invokes the thermal management unit.

The thermal management unit in this embodiment may be invoked by detection/control circuitry associated with any one of the processor cores. When the thermal management unit is invoked, it evaluates the information received from the detection/control circuitry corresponding to the processor core that invoked it (the over-temperature core.) The evaluation may also include information from the detection/control circuitry corresponding to others of the processor cores. Based upon its evaluation of this thermal information, the thermal management unit determines what action should be taken to reduce the temperature of the over-temperature processor core and to thereby eliminate the thermal event.

In one embodiment, the thermal management unit is configured, upon being notified that a thermal event has occurred, to determine whether one of the processor cores is executing a lighter context than the over-temperature processor core. If one of the processor cores is executing a lighter context, the thermal management unit causes the context of this processor core to be swapped with that of the over-temperature processor core. The lighter context should reduce the amount of heat being generated in the over-temperature processor core and thereby reduce the temperature(s) that gave rise to the thermal event. If none of the other processor cores are executing a lighter context, the thermal management unit may cause the contexts to be swapped between the over-temperature processor core and one of the other processor cores that is experiencing lower temperatures. If neither of these options is available, the thermal management unit may cause the operation of the over-temperature processor core alone to be adjusted. For instance, the thermal management unit may reduce the clock speed of this processor core, reduce its power supply voltage, suspend its operation altogether, or take some other action to reduce the temperatures corresponding to this processor core.

As noted above, the present systems and methods make use of multiple thermal sensors to sense temperatures associated with the different functional blocks in a device. An exemplary thermal sensor is illustrated by FIG. 1, which is a block diagram showing the structure of one type of thermal sensing circuit. As shown in this figure, a thermal sensing element 130 is provided to sense the temperature at a desired location. Thermal sensing element 130 generates a voltage that varies with the temperature of the sensing element. The sensing element may, for example, be a diode. The voltage generated by a thermal sensing element such as a diode decreases as the temperature of the sensing element increases.

A reference voltage generator 110 is also provided. A trimming circuit 120 may also be provided to adjust the output of the reference voltage generator. The purpose of reference voltage generator 110 is to generate a reference voltage to which the voltage across the thermal sensing element can be compared. When the voltage across the thermal sensing element is the same as the reference voltage, the sensed temperature is the same as a threshold temperature. If the voltage across the thermal sensing element is greater than the reference voltage, the sensed temperature is below the threshold temperature, and if the voltage across the thermal sensing element is less than the reference voltage, the sensed temperature is above the threshold temperature.

It should be noted that, although most conventional systems use a reference voltage that is constant over the range of possible temperatures, this is not necessary. A reference voltage that varies with temperature may also be used as long as the threshold voltage (and corresponding threshold temperature) at which the voltage across the thermal sensing element crosses over the reference voltage is known.

The reference voltage generated by reference voltage generator 110 and the voltage generated by thermal sensing element 130 are both provided to comparator 140. Comparator 140 is configured to determine whether the voltage provided by thermal sensing element 130 is higher or lower than the reference voltage provided by reference voltage generator 110. Comparator 140 generates a binary output signal that is asserted (or not) depending upon the relationship between the two received voltages. Typically, comparator 140 will be configured to generate a signal that is high when the voltage generated by thermal sensing element 130 is lower than the reference voltage of reference voltage generator 140 (i.e., the sensed temperature is higher than the temperature corresponding to the reference voltage.) The signal generated by comparator 140 can then be provided to a control circuit which is configured to take corrective action if the signal from comparator 140 is asserted.

Figure 2:
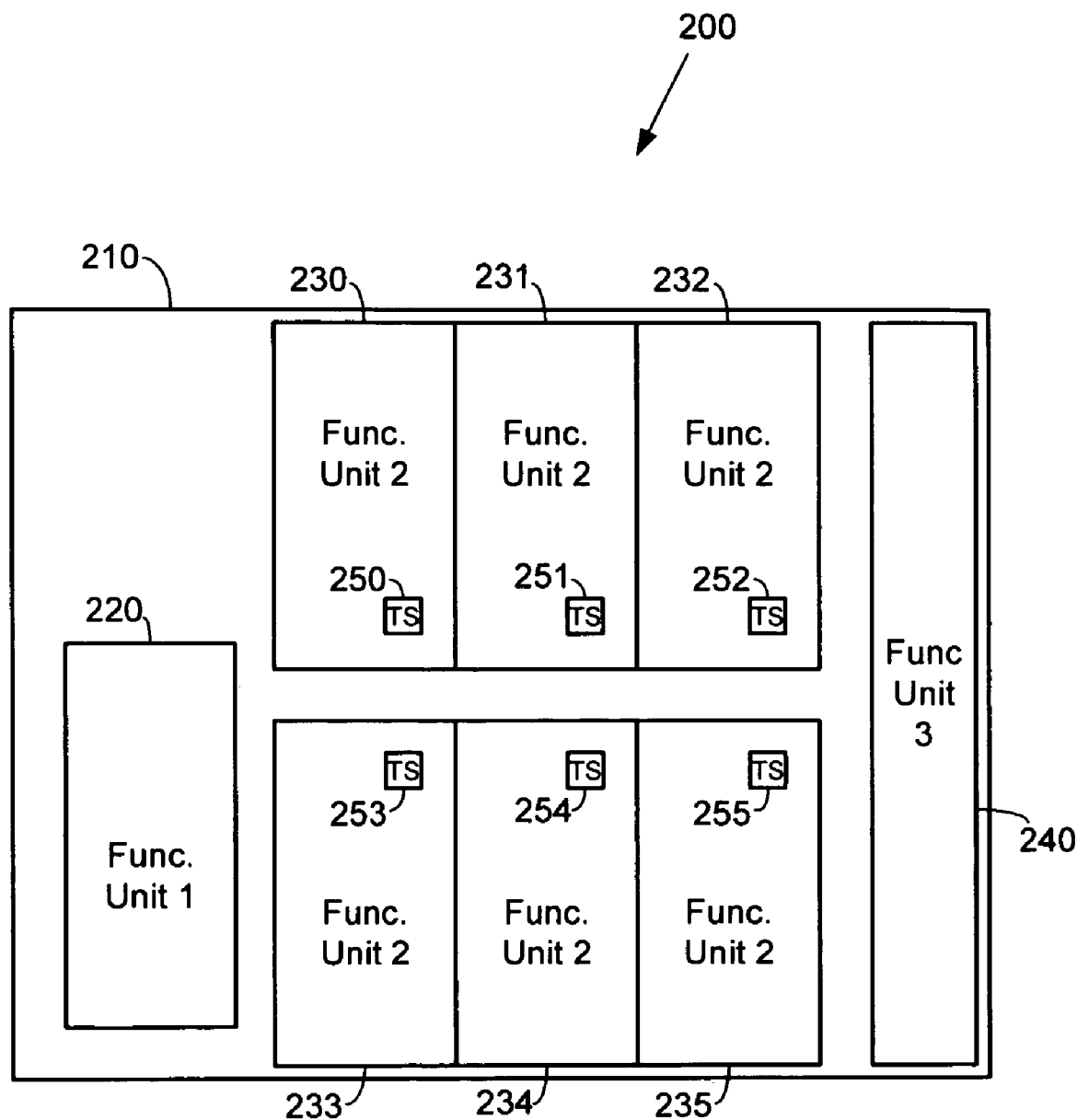
FIG. 2 is a diagram illustrating an integrated circuit that makes use of small, on-chip thermal sensors to monitor the temperatures of a set of duplicate functional blocks in accordance with one embodiment.

Referring to FIG. 2, a diagram illustrating an integrated circuit that makes use of these small, on-chip thermal sensors to monitor the temperatures of a set of functional blocks in accordance with one embodiment is shown.

In the embodiment of FIG. 2, an integrated circuit chip 200 includes multiple functional blocks. "Functional block," as used here, refers to a block of logic and/or circuitry on the integrated circuit that serves a particular function. For example, as shown in the figure, integrated circuit chip 200 includes nine functional blocks, 210, 220, 230-235 and 240. (Although not depicted as a rectangular block like the other functional blocks in the figure, functional block 210 includes logic and/or circuitry that serves a separate function in the integrated circuit.) Functional blocks 230-235 of integrated circuit 200 are duplicates of each other.

It should be noted that "duplicate," as used herein, is intended to include functional blocks that may not be identical in every physical detail or in configuration.

For example, functional blocks 230-232 may be mirror images of functional blocks 233-235. As another example, if functional blocks 230-235 are data processing units, one of these units may be configured as a master, while the others are configured as slaves. There may be other minor differences as well.

Integrated circuit 200 is representative of a multiprocessor, where each of functional blocks 230-235 is a separate processor core. Functional blocks 210, 220 and 240 provide functions that are used in support of the processing functions of processor cores 230-235, such as data storage (memory,) input/output (I/O,) and the like.

In addition to the functional blocks, integrated circuit 200 includes a set of thermal sensors, 250-255. Each of thermal sensors is coupled to a corresponding one of processor cores 230-235. (Although the figure depicts only a single thermal sensor coupled to each processor core, alternative embodiments may have more than one sensor coupled to each processor core.) The coupling of thermal sensors to each of the processor cores enables the independent sensing of temperatures corresponding to each of the different processor cores. This is important because, even though the processor cores are duplicates of each other, different tasks may be performed by each of the processor cores. Consequently, the different processor cores may experience different levels of loading (number of operations performed) and may dissipate different amounts of heat. Some of the processor cores may therefore reach critical temperatures while others do not.

As noted above, simply measuring the temperature of the integrated circuit at different locations does not eliminate the problem that performance is reduced when thermal management is based on a worst-case scenario (i.e., when the operation of the entire integrated circuit is slowed or shut down to reduce the temperature in a single spot in the circuit.) A mechanism is therefore provided in the present system to adjust the operation of the individual functional blocks, rather than the operation of the integrated circuit as a single unit.

Figure 3:
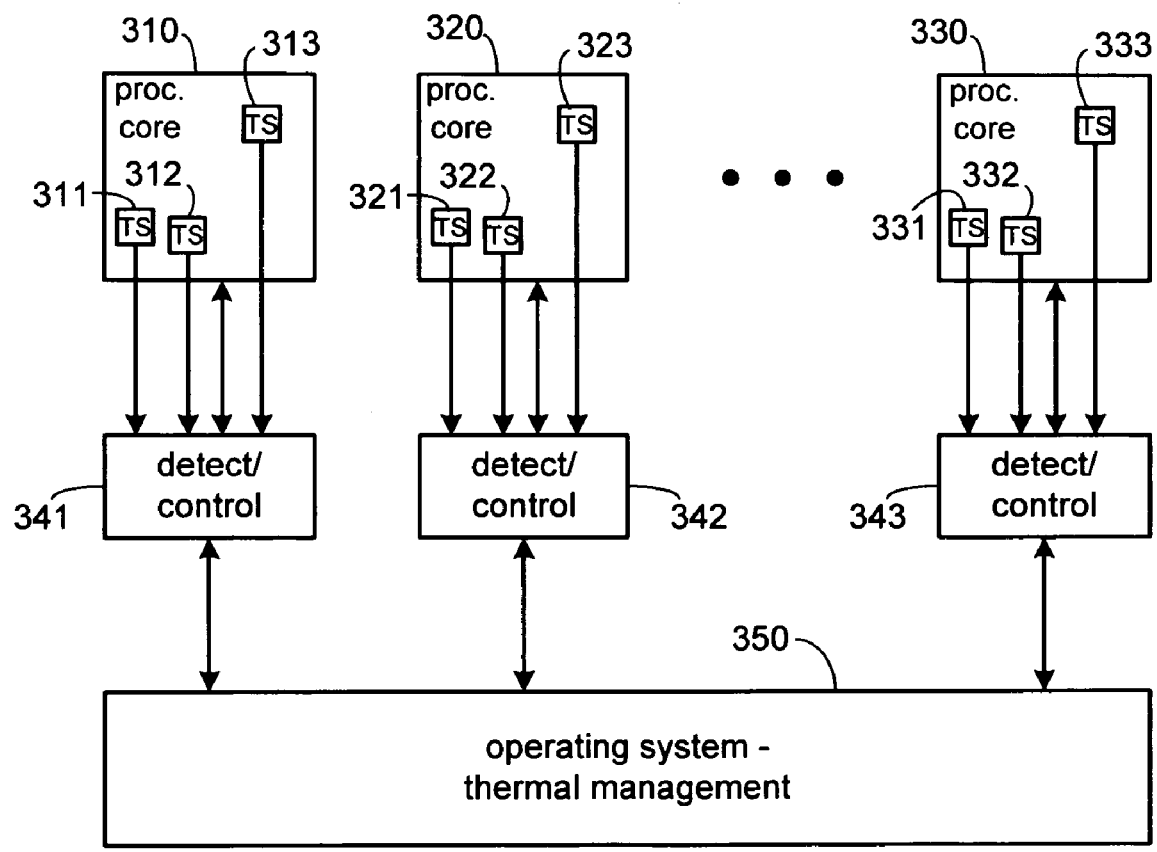
FIG. 3 is a functional block diagram illustrating the structure of a thermal management system in accordance with one embodiment.

Referring to FIG. 3, a functional block diagram illustrating the structure of the thermal management system in accordance with one embodiment is shown. In this embodiment, each of processor cores 310, 320 and 330 has a corresponding set of thermal sensors (311-313, 321-323 and 331-333, respectively) to measure the temperatures of the processor cores. The outputs of the thermal sensors coupled to a particular one of the processor cores are provided to corresponding detection/control circuitry (341-343.)

Detection/control circuitry 341-343 is configured to determine whether, based on the received thermal sensor signals, there is a thermal condition that requires the operation of the corresponding processor core (310, 320, 330) to be adjusted in a way that will reduce the sensed temperature. If adjustment of the processor core's operation is necessary, the detection/control circuitry may provide appropriate control signals to the processor core to adjust its operation. The detection/control circuitry may also provide information (e.g., the received thermal sensor signals, or control signals that are based on the measured temperatures) to a thermal management block 350, which can evaluate this information and make appropriate thermal management decisions.

Because thermal management block 350 is coupled to all of processor cores 310, 320, 330 through corresponding detection/control circuitry 341-343, the thermal management block may be able to coordinate adjustments between the processor cores. For example, if one of the processor cores reaches a threshold temperature while another of the processor cores has a relatively low temperature, the thermal management block may redirect some of the processing load of the higher-temperature processor core to the lower-temperature processor core. If the thermal management block cannot redirect the processing loads of the processor cores in this manner, it may limit the temperature of the higher-temperature core using conventional methods on that processor core individually. For instance, the thermal management block may reduce the clock speed of the high-temperature processor core, while the remaining processor cores operate at the normal clock speed.

It should be noted that the allocation of functions between different components of the control circuitry (detection/control circuitry 341-343 and thermal management block 350) in this embodiment is exemplary. In alternative embodiments, the detection of thermal events, determining the action to be taken in response to these events, etc. may be allocated in a different manner. For example, all of these functions may be implemented in the same circuitry, or they may be divided among these and/or other components of the thermal management system.

Figure 4:
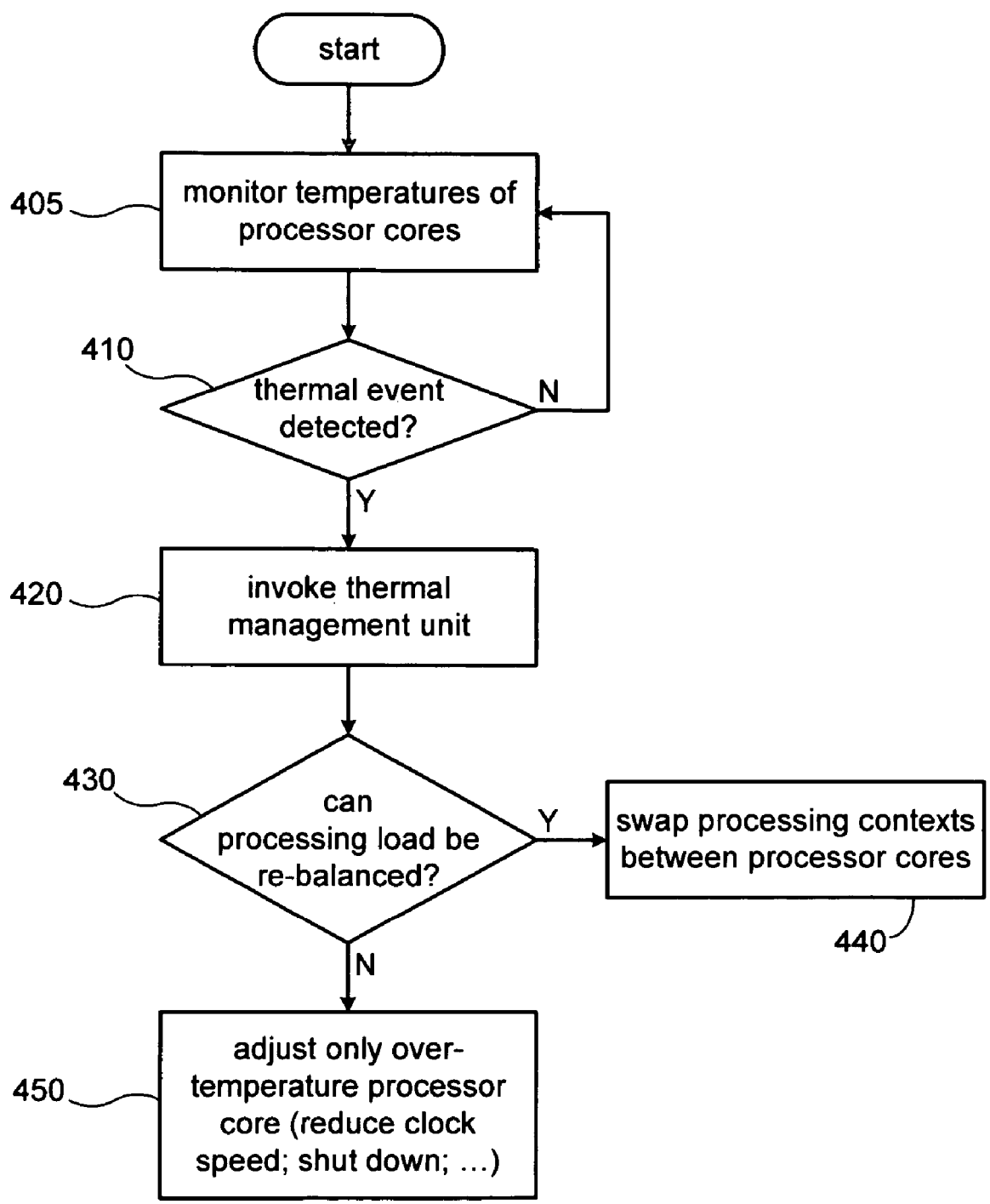
FIG. 4 is a flow diagram summarizing the operation of a multiprocessor integrated circuit utilizing the thermal management system of FIG. 3.

Referring to FIG. 4, a flow diagram summarizing the operation of a multiprocessor integrated circuit utilizing the thermal management system of FIG. 3 is shown. While the multiprocessor is operating, the detection/control circuitry for each processor core monitors the signals generated by the corresponding thermal sensors on the processor core (block 405) to determine whether a thermal event has occurred (block 410.) If no thermal events are detected, the detection/control circuitry for the processor cores continue to monitor the corresponding thermal sensor signals (block 405.) If, on the other hand, one of the detection/control circuits detects a thermal event, that detection/control circuit invokes the thermal management routine in the operating system (420.)

It is the responsibility of the thermal management routine in this embodiment to determine what action should be taken to reduce the temperature of the processor core that resulted in the detected thermal event (the "over-temperature" processor core.) The thermal management routine performs this function by first determining whether the operations being performed by the various processing cores can be redirected so that the thermal load can be reduced in the over-temperature processor core. In particular, the thermal management routine in this embodiment determines whether one of the other processor cores that has not experienced a thermal event is executing a lighter context than the over-temperature processor core (block 430.) If there is a processor core that is currently executing a lighter context, the thermal management routine causes the context of this processor core and the over-temperature processor core to be swapped (block 440.) If none of the other processor cores is executing a lighter context, then the thermal management routine may swap contexts between the over-temperature processor core and another processor core that has an equally heavy context, but which is at a lower temperature and can therefore better tolerate the temperature increase associated with the over-temperature processor core's context.

If none of the other processor cores is found to be suitable for swapping contexts (e.g., is executing a lighter context,) then the thermal management routine acts to reduce the processing load of the over-temperature processor core, independent of the processing being performed by the other processor cores (block 450.) For example, it may be determined that the over-temperature processor core should be operated at a reduced clock speed. As another alternative, the execution of instructions on the over-temperature processor core may be started and stopped to allow the temperature to decrease. The processor core may alternatively suspend execution of further operations until its temperature has been reduced to safe levels. Still another alternative may be to reduce the power supply voltage at which the processor core operates. Other alternatives may be available as well.

As noted above, in the exemplary method of FIG. 4, the approach for reducing the temperature of a processor core involves first attempting to swap contexts between different processor cores so that the over-temperature core executes a lighter context. It should be noted that the new context for the over-temperature processor core need not be lighter in a strict sense. In other words, the new context may have simply a better distribution of instructions among the various functional units within the processor core. For example, the processor core may detect a thermal event in which a floating-point arithmetic unit reaches a critical temperature, but other functional units (e.g., an integer arithmetic unit) are at low temperatures. In this case, it may be advantageous to swap the current context (which has a large percentage of floating-point operations) for a context which might be considered just as heavy a context, but which has a much lower percentage of floating-point operations.

As noted above, there may be various different types of thermal events. For instance, it may be considered a thermal event when the temperature detected by one of the thermal sensors exceeds a predetermined threshold. It may also be considered a thermal event when the average of the temperatures detected by several thermal sensors exceeds a predetermined threshold. It may also be considered a thermal event when the temperature detected by one of the thermal sensors increases by more than a predetermined amount in a selected interval. It may also be considered a thermal event when a temperature sensed by one of the sensors remains above a predetermined threshold temperature for a predetermined interval, or for a predetermined percentage of an interval. The various thermal events may be predefined, or they may be defined in software or firmware so that they are programmable. These examples are intended merely to illustrate a few of the thermal events that may be possible, and many more will be apparent to persons of skill in the art of invention.

It should also be noted that the thermal events need not all have the same severity. For instance, some thermal events may indicate that there is a critical condition (possibly requiring shut-down of a processor core,) while other thermal events may indicate non-critical conditions (e.g., the temperature is above an expected level, but does not require immediate action.) The different types of thermal events may be characterized according to their severity to facilitate processing by the thermal management routine. For example, "green" events may indicate that action should be taken if possible without reducing performance, "yellow" events may indicate that action should be taken, even if performance is reduced, and "red" events may indicate that a processor core should be shut down. Of course, many other such schemes are possible as well.

In the embodiment described above, detection of a thermal event causes a detection/control circuit to invoke a thermal management routine in the operating system. The thermal management routine may be invoked in various ways, such as by generating an interrupt that causes the thermal management routine to become active. Alternatively, the thermal management routine may remain active while the thermal sensors are being monitored, but may only process this information to determine a course of action if triggered to do so by a signal indicating that a thermal event has occurred. In yet another embodiment, the thermal management routine may comprise circuitry (hardware) rather than a routine in the operating system (software,) and may continually process that received signals to generate a corresponding course of action, in case this information is needed by the detection/control circuitry.

In the embodiment of FIG. 4, the thermal management unit, upon being notified that a thermal event has occurred, will attempt to reduce the temperatures associated with the thermal condition by first attempting to re-balance the processing load between the processor cores, and scaling back operation of an individual processor core if load-balancing is not possible. In other embodiments, the loading of the processor cores (or other functional blocks) may be adjusted in other ways, such as by scaling back operation of the over-temperature processor core without first attempting to balance the load between this and other processor cores.

As depicted in FIG. 4, the thermal management unit attempts to determine whether processor cores other than the over-temperature processor core are executing lighter contexts than the over-temperature processor core. As used herein, the context which is being executed by a processor core is the type of operations that are being performed by the processor core. For example, the context being executed by a processor core may include simple, integer-type operations, or they may include more computation-intensive operations such as floating-point operations. Because integer operations are less computationally intensive than floating-point operations, execution of these instructions typically requires less power and generates less heat then execution of floating-point instructions. Contexts which are characterized by predominantly integer operations are therefore considered "lighter" contexts than those which are characterized by predominantly floating-point operations. Then, because the lighter contexts cause less heat to be generated in the processor cores executing these contexts, it is advantageous to shift the processing duties of the processor cores so that the lighter contexts are executed by the processor cores that are experiencing higher temperatures.

The characterization of the context associated with a particular processor core (i.e., determining whether the context is a lighter or heavier context) may be accomplished in various ways. In one embodiment, the context associated with each processor core may be statically profiled. That is, the instruction stream for each processor core may be analyzed, and the instructions categorized based upon the type of processing load (e.g., heavier or lighter) with which those instructions are typically associated. For example, if an instruction stream is expected to involve a large number of floating-point operations, it may be characterized as a heavier context. The context of each processor core can alternatively be dynamically profiled. In this case, when a thermal event occurs, the thermal management system may log information identifying the context that caused the event, as well as temperature information related to the event. This log information can be stored with the context itself, in a database, or in an alternative storage that is accessible by the thermal management system. Then, when this context appears on other processor cores, it can then be identified as one which is heavier and consequently more likely to cause thermal events.

It should be noted that the shifting of the processing load between processor cores to reduce the thermal load on selected ones of the processor cores can be accomplished in many different ways. This load shifting can comprise redirecting the entire processing load of one processor core to another, or it may comprise simply redirecting a subset of instructions/operations from one processor core to another. Also, as noted above, the processing load between the processor cores can be balanced by, e.g., slowing the execution rate of an over-temperature processor core so that it executes fewer instructions (but none of the instructions are redirected to the processors.)

In addition to the exemplary embodiments described above, there may be numerous alternative embodiments that incorporate numerous additional features. Referring again to the embodiment of FIG. 2, it can be seen that each of thermal sensors 250-252 is positioned in the same location with respect to the corresponding one of functional blocks 230-232. Similarly, each of thermal sensors 253-255 is positioned in the same location with respect to the corresponding one of functional blocks 233-235. It is assumed for the purposes of this disclosure that functional blocks 233-235 are mirror images of functional blocks 230-232. Consequently, each of thermal sensors 250-255 is considered to be positioned in the same location with respect to the corresponding one of functional blocks 230-235 (i.e., at the location of the same functional components within the corresponding functional block.)

In one embodiment, each of thermal sensors 250-255 is positioned at a hot spot on the corresponding one of functional blocks 230-235. In many instances, the physical layout of an integrated circuit will have one or more areas that include a higher concentration of components that experience a high level of activity during normal operation. Because there is a high level of activity in these areas, the amount of power used by the circuit components in these areas is higher and a greater amount of heat is dissipated in these areas than in other areas of the integrated circuit. Because of the higher levels of activity and greater power dissipation in these areas, they are often referred to as "hot spots."

Figure 5:
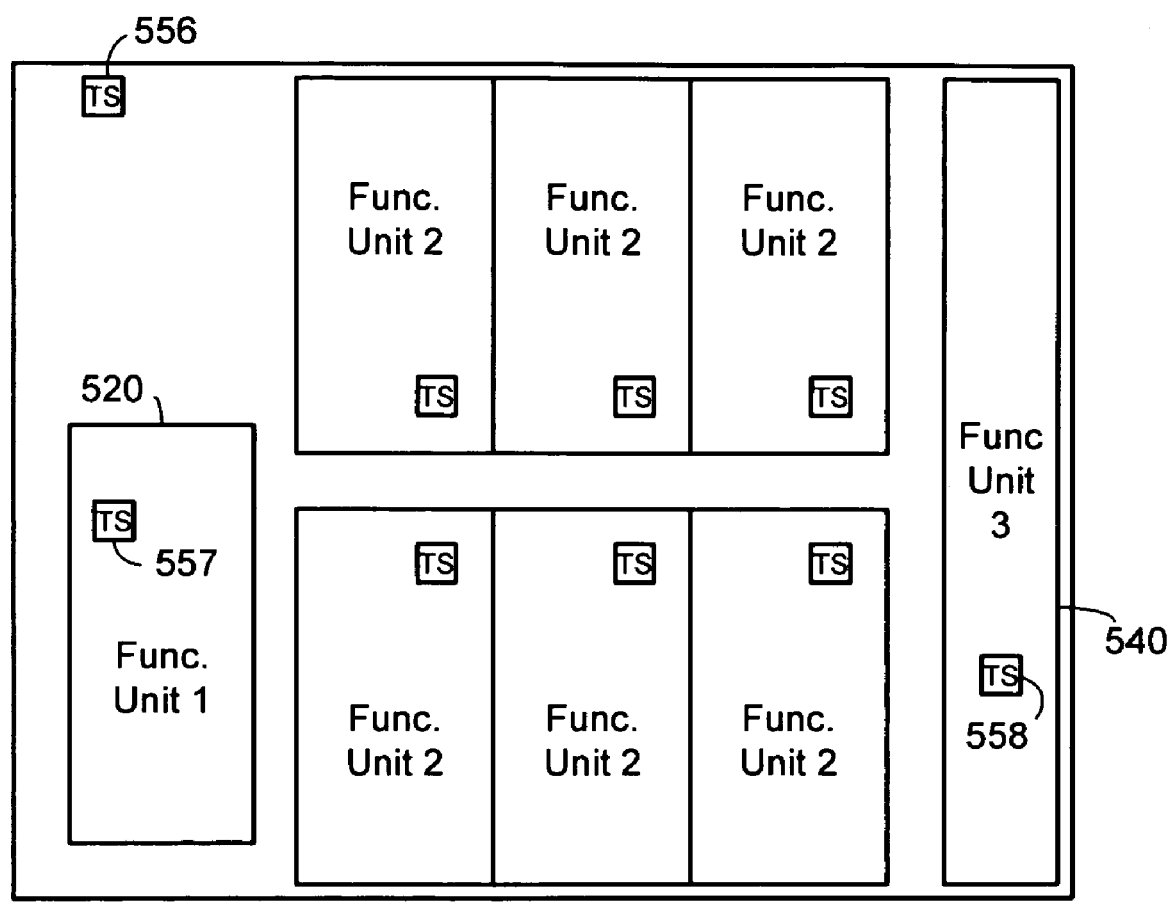
FIG. 5 is a functional block diagram illustrating an integrated circuit in accordance with an alternative embodiment.

Referring to FIG. 5, a functional block diagram illustrating an integrated circuit in accordance with an alternative embodiment is shown. In this figure, there is again a thermal sensor positioned on each of the duplicate functional blocks as in FIG. 2. Additionally, there are thermal sensors positioned on one or more of the other functional blocks in the integrated circuit. In this instance, thermal sensor 557 is positioned on functional block 520, and thermal sensor 558 is positioned on functional block 540. In one embodiment, each of these thermal sensors is positioned at a hotspot of the corresponding one of the functional blocks.

Additionally, there is a thermal sensor 556 which is positioned at a cool spot on the integrated circuit. The "cool spot" is a location where there is little or no activity in the integrated circuit, so very little heat is dissipated in this area, causing it to remain cooler than other areas of the integrated circuit. The cool spot may be a location where the integrated circuit has no functional components, or there may be functional components that experience relatively low levels of activity and generate less heat than other areas of the integrated circuit (e.g., memory cells.) In one embodiment, the sensor is positioned near the edge of the integrated circuit.

It may be useful to position a thermal sensor in a cool spot on the integrated circuit in order to obtain information regarding, for example, temperature gradients across the integrated circuit chip. Because the characteristics of some circuit components may change with temperature, temperature gradients across the integrated circuit may cause variations in timing or other changes that may affect the performance of the integrated circuit. Cool spot temperature measurements may also be useful in determining minimum or ambient temperatures for the chip that can provide the basis for controlling chip-level (as opposed to functional-block-level) actions.

While the embodiments described above are implemented in multiprocessor integrated circuits, it should be noted that alternative embodiments may be implemented in other types of devices. For example, the functional blocks being monitored and controlled by the thermal management system need not be processor cores, and may include any other type of component for which the corresponding functions can be controlled to affect the amount of heat generated within the device. Likewise, it is not necessary that the functional blocks being controlled by the thermal management system be identical, or that the thermal sensors' numbers, placement, etc. be identical.

It should be noted that the embodiments above describe systems and methods in which multiple functional blocks in a device have their operation individually or independently adjusted. For the purposes of this disclosure, references to individual or independent adjustment of the functional blocks' operation are intended to convey the capability of adjusting the operation of one or more of the functional blocks without affecting the operation of the other functional blocks. In some instances, the operation of only one functional block may be adjusted (e.g., the clock speed may be reduced.) In other instances, the operation some of all of the functional blocks may be adjusted (e.g., their contexts may be swapped.) References to individual or independent adjustment of the functional blocks' operation are references to individual or independent adjustment of the functional blocks' operation not intended to imply that the operation of all of the functional blocks must be entirely independent of each other in every instance.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields or particles or any combination thereof.

The various illustrative logical blocks, modules, and circuits described in connection with the embodiments disclosed herein may be implemented or performed with various types of devices, including general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of methods or algorithms described in connection with the embodiments disclosed herein may be embodied directly in hardware, in a software module executed by a processor, or in a combination of the two.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A system comprising:
   an integrated circuit having a plurality of functional blocks;
   a first set of thermal sensors, wherein each of the first set of thermal sensors is coupled to a corresponding one of the functional blocks; and
   control circuitry coupled to each of the thermal sensors in the first set, wherein the control circuitry is configured to detect thermal events in the functional blocks and to individually adjust operation of one or more of the functional blocks by swapping operations being performed by a first one of the functional blocks and a second one of the functional blocks and thereby reducing temperatures in one or more of the functional blocks.

2. The system of claim 1, wherein the control circuitry is configured to halt operation of at least one of the functional blocks operates and to maintain operation of at least one of the other functional blocks.

3. The system of claim 1, wherein the functional blocks comprise duplicate functional blocks.

4. The system of claim 3, wherein the first set of thermal sensors are positioned at identical locations on the duplicate functional blocks.

5. The system of claim 3, wherein the functional blocks comprise processor cores.

6. The system of claim 5, wherein the control circuitry is configured to determine whether contexts being executed by one or more of the processor cores are lighter than a first context being executed by a first processor core that is experiencing a thermal event, and to swap the corresponding contexts between the first processor core and one of the processor cores executing a lighter context.

7. The system of claim 6, wherein the control circuitry is configured to analyze instruction streams associated with one or more of the processor cores and to characterize the context being executed by each of the one or more processor cores based upon the corresponding analyzed instruction stream.

8. A method comprising:
   monitoring temperatures of a plurality of functional blocks in an integrated circuit;
   detecting thermal events in the functional blocks; and
   individually adjusting operation of one or more of the functional blocks by swapping operations being performed by a first one of the functional blocks and a second one of the functional blocks and thereby reducing the temperatures of one or more of the functional blocks.

9. The method of claim 8, wherein individually adjusting operation of one or more of the functional blocks comprises halting operation of at least one of the functional blocks operates while maintaining operation of at least one of the other functional blocks.

10. The method of claim 8, wherein the functional blocks comprise duplicate functional blocks.

11. The method of claim 10, wherein monitoring temperatures of the plurality of functional blocks comprises monitoring temperatures at identical locations on the duplicate functional blocks.

12. The method of claim 10, wherein monitoring temperatures of the plurality of functional blocks comprises monitoring temperatures of a plurality of processor cores.

13. The method of claim 12, further comprising determining whether contexts being executed by one or more of the processor cores are lighter than a first context being executed by a first processor core that is experiencing a thermal event, and swapping contexts between the first processor core and one of the processor cores executing a lighter context.

14. The method of claim 13, further comprising analyzing instruction streams associated with one or more of the processor cores and characterizing the context being executed by each of the one or more processor cores based upon the corresponding analyzed instruction stream.

* * * * *